(12) United States Patent
Yoon et al.

(10) Patent No.: US 8,605,227 B2
(45) Date of Patent: Dec. 10, 2013

(54) IMAGE DISPLAY DEVICE USING DIFFRACTIVE DEVICE

(75) Inventors: Il-Yong Yoon, Bucheon-si (KR);
Seung-Jun Jeong, Asan-si (KR);
Jin-Hwan Kim, Suwon-si (KR);
Hae-Young Yun, Suwon-si (KR);
Seung-Hoon Lee, Hwaseong-si (KR);
Il-Joo Kim, Suwon-si (KR);
Jung-Hwan Yi, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 177 days.

(21) Appl. No.: 13/237,337

(22) Filed: Sep. 20, 2011

(65) Prior Publication Data

US 2012/0105750 A1 May 3, 2012

(30) Foreign Application Priority Data

Oct. 29, 2010 (KR) .................. 10-2010-0106853

(51) Int. Cl.
*G02F 1/1335* (2006.01)
(52) U.S. Cl.
USPC ............................................................ 349/15

(58) Field of Classification Search
USPC ............................................................ 349/15
See application file for complete search history.

(56) References Cited

U.S. PATENT DOCUMENTS

| 8,319,902 B2 * | 11/2012 | Kim et al. ............. 349/15 |
| 2007/0296911 A1 | 12/2007 | Hong |
| 2010/0026920 A1 * | 2/2010 | Kim et al. ............. 349/15 |
| 2012/0019733 A1 * | 1/2012 | Kim et al. ............. 349/15 |
| 2012/0162550 A1 * | 6/2012 | Jeong et al. .......... 349/15 |
| 2013/0208196 A1 * | 8/2013 | KIM et al. ............. 349/15 |

FOREIGN PATENT DOCUMENTS

| KR | 1020090004006 | 1/2009 |
| KR | 1020110085612 | 7/2011 |
| KR | 1020110104701 | 9/2011 |

* cited by examiner

*Primary Examiner* — Timothy L Rude
(74) *Attorney, Agent, or Firm* — F. Chau & Associates, LLC

(57) ABSTRACT

An image display device includes a display panel displaying an image and a diffractive device. The diffractive device operates in a 2D mode to enable perception of a 2D image from the image of the display panel and in a 3D mode to enable perception of the image of the display panel as a 3D image. The diffractive device includes a plurality of unit devices. When the diffractive device operates in 3D mode, at least one of the plurality of unit devices operates in a lens mode and a barrier mode during different periods.

5 Claims, 19 Drawing Sheets

Amplitude modulation type fresnel zone plate

Phase modulation type fresnel zone plate

IMAGE DISPLAY DEVICE USING DIFFRACTIVE DEVICE

CROSS-REFERENCE TO RELATED APPLICATION

This application claims priority to Korean Patent Application No. 10-2010-0106853 filed in the Korean Intellectual Property Office on Oct. 29, 2010, the disclosure of which is incorporated by reference herein.

BACKGROUND (a) Technical Field

Embodiments of the present invention relate to an image display device using a diffractive device.

(b) Discussion of Related Art

A three dimensional (3D) image may be visualized by stereovision through both eyes. A binocular disparity is generated by a visual disparity between both eyes, i.e., the distance between both eyes. For example, the left and right eyes view different 2D images and when both images are transferred to the brain through the retina, the brain fuses the images to create a 3D image.

Stereoscopy is a method of displaying stereoscopic 3D images. A 3D image display device may include a barrier and a lenticular lens (e.g., a kind of cylindrical lens). The barrier includes a slit that divides the image from the display device into a left-eye image and a right-eye image. The lens can magnify these images.

However, a display device that includes both the lens and the barrier has an increased volume, which may be undesirable.

SUMMARY

At least one embodiment of the present invention has been made in an effort to provide an image display device that is easy to mass-produce.

An exemplary embodiment of the present invention provides an image display device that includes a display panel configured to display an image and a diffractive device. The diffractive device is configured to operate in a 2D mode to enable the image of the display panel to be perceived as a 3D image and in a 3D mode to enable the image of the display panel to be perceived as a 3D image. The diffractive device includes a plurality of unit devices. When the diffractive device operates in the 3D mode, at least one of the plurality of unit devices operates in a lens mode and a barrier mode during different periods.

The unit device may include a first substrate and a second substrate facing each other, a first electrode layer formed on the first substrate, a second electrode layer formed on the second substrate, and a liquid crystal layer interposed between the first substrate and the second substrate.

The second electrode layer may include a common electrode and the at least one unit device may operate in the lens mode or barrier mode based on a voltage applied to the first electrode layer. The unit device may periodically alternate between operating in the lens mode and the barrier mode.

When the unit device operates in the lens mode, the applied voltage may cause the unit device to operate as a Fresnel zone plate and when the unit device operates in the barrier mode, the applied voltage may set transmittance of the unit device to a predetermined value or less.

The first electrode layer may include a first electrode array including a plurality of first electrodes, a second electrode array including a plurality of second electrodes, and an insulating layer insulating between the first electrode array and the second electrode array.

When the unit device operates in the barrier mode, a first voltage may be applied to the first electrode array and a second voltage lower than the first voltage may be applied to the second electrode array. When the unit device operates in the barrier mode, the common electrode may be floated. When the unit device operates in the barrier mode, the second electrode array may be floated and the voltage may be applied to the first electrode array to form an electric field between the adjacent first electrodes.

The first electrode layer may include a first electrode array including a plurality of first electrodes, a second electrode array including a plurality of second electrodes, and a first insulating layer insulating between the first electrode array and the second electrode array and the second electrode layer may include a third electrode array including a plurality of third electrodes, a fourth electrode array including a plurality of fourth electrodes, and a second insulating layer insulating the third electrode array and the fourth electrode array from each other.

When the unit device operates in the barrier mode, a first voltage may be applied to the first electrode array and the third electrode array and a second voltage lower than the first voltage may be applied to the second electrode array and the fourth electrode array.

When the unit device operates in the lens mode, a common may be applied to the third electrode array and the fourth electrode array so that the second electrode layer operates as the common electrode.

When the unit device operates in the barrier mode, a first voltage may be applied to some first electrodes among the plurality of first electrodes and a second voltage lower than the first voltage may be applied to some fourth electrodes among the plurality of fourth electrodes, and the rest of the first to fourth electrodes may be floated.

The unit device may include a plurality of zones positioned between the center of the unit and an outer point, where each zone may include at least one of the first electrode and at least one second electrode, and the numbers of the first electrodes and the second electrodes in each zone may increase as one moves toward the center from the outside.

When the unit device operates in the lens mode, each voltage applied to the first electrode and the second electrode in each zone may be changed stepwise as one moves toward the center of the unit device and the voltage of the first electrode or the second electrode corresponding to the same subzone in the plurality of zones may be applied to generate a same phase delay.

An exemplary embodiment of the present invention provides an image display device that includes a display panel configured to display an image and a diffractive device. The diffractive devices operates in a 2D mode to enable the image of the display panel to be perceived as a 2D image and a 3D mode to enable the image of the display panel to be perceived as a 3D image. The diffractive device includes a plurality of units and barriers formed on boundaries between the plurality of unit devices.

The diffractive device may include a first substrate and a second substrate facing each other, a first electrode layer formed on the first substrate, a second electrode layer formed on the second substrate, and a liquid crystal layer interposed between the first substrate and the second substrate.

The second electrode layer may include a common electrode. The first electrode layer may include a first electrode array including a plurality of first electrodes, a second electrode array including a plurality of second electrodes, and a first insulating layer insulating between the first electrode array and the second electrode array.

A first voltage may be applied to the first electrode array of a portion corresponding to the barrier among the first electrode layer and a second voltage lower than the first voltage may be applied to the second electrode array of the portion corresponding to the barrier among the first electrode layer.

Both widths of the plurality of first electrodes and widths of the plurality of second electrodes may be the same. Locations of the plurality of unit devices and the barrier may be shifted as time elapses. The common electrode of a portion corresponding to the barrier among the second electrode layer may be floated.

An exemplary embodiment of the present invention provides an image display device that includes a display panel configured to display a 2D image and a diffractive device configured to diffract the 2D image. The diffractive device includes a first substrate, a first electrode layer located on top of the first substrate, a first alignment layer located on top of the first electrode layer, a second substrate facing the first substrate, a second electrode layer located on top of the second substrate, a second alignment layer located on top of the second electrode layer, and a liquid crystal layer located between the first and second alignment layers. A region encompassing the electrode layers, alignment layers, and the liquid crystal layer is divided into a plurality of substantially equally sized units that are bounded by the substrates. At least one of the plurality of units is configured to operate as a lens and a barrier to light during different periods to enable the 2D image to be perceived as a 3D image.

The even numbered units may operate as the lens and the odd numbered units may operated as the barrier, or vice versa. When the units number six, the second and fifth units may operate as the lenses, while the first, third, fourth, and sixth units operate as the barriers.

DETAILED DESCRIPTION OF EXEMPLARY EMBODIMENTS

Figure 1:
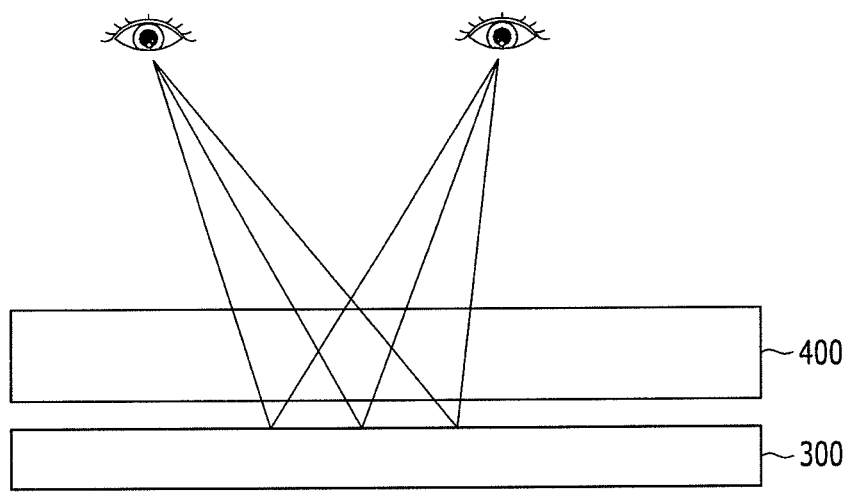
FIG. 1 is a schematic structure of an image display device and a diagram showing a method of forming a 2D image according to an exemplary embodiment of the present invention.

The present invention will be described more fully hereinafter with reference to the accompanying drawings, in which exemplary embodiments of the invention are shown.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

Figure 2:
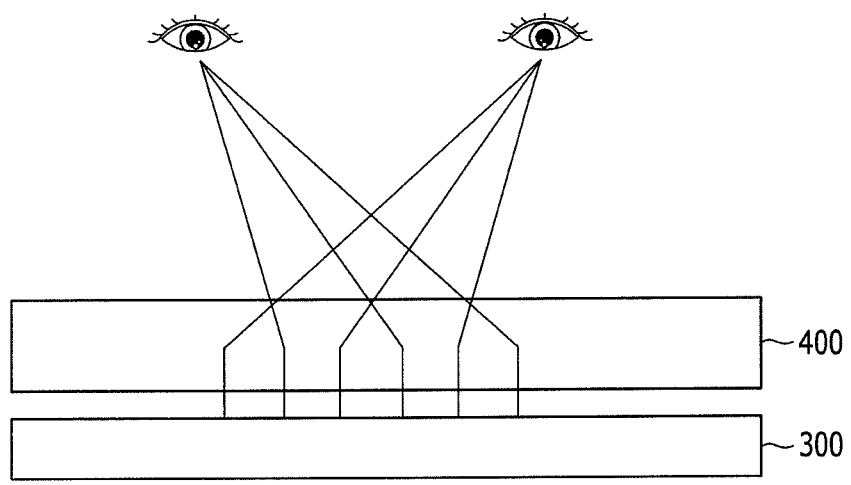
FIG. 2 is a schematic structure of an image display device and a diagram showing a method of forming a 3D image according to an exemplary embodiment of the present invention.

FIGS. 1 and 2 are a schematic structure of an image display device and a diagram showing a method of forming a 2D image and a 3D image, respectively according to an exemplary embodiment of the present invention.

Referring to FIGS. 1 and 2, the image display device includes a display panel 300 displaying an image and a diffractive device 400 positioned in front of a surface on which the image of the display panel 300 is displayed. The display panel 300 and the diffractive device 400 may operate in a 2D mode or a 3D mode.

The display panel 300 may be various flat panel display devices such as a plasma display panel (PDP), a liquid crystal display, an organic light emitting diode (OLED) display, and the like. The display panel 300 is arranged in a matrix form and includes a plurality of pixels PX displaying the image. The display panel 300 displays one flat image in the 2D mode, but may alternately display an image corresponding to various viewing areas such as a right eye image and a left eye image in a spatial or temporal division method in the 3D mode. For example, in the 3D mode, the display panel 300 may alternately display the right eye image and the left eye image for each pixel in one column.

The diffractive device 400 transmits the image displayed in the display panel 300 as it is in the 2D mode and divides viewing areas of the image of the display panel 300 in the 3D mode. For example, the diffractive device 400 operating in the 3D mode refracts the image displayed in the display panel 300 using a diffraction phenomenon of light, such that the image is focused in the corresponding viewing area.

FIG. 1 is an example where the display panel 300 and the diffractive device 400 operate in the 2D mode, which shows that the 2D image is recognized when the same image reaches the left eye and then the right eye. FIG. 2 is an example where the display panel 300 and the diffractive device 400 operate in the 3D mode, which shows that the 3D image is recognized when the diffractive device 400 divides and refracts the image of the display panel 300 into each viewing area such as the left eye and the right eye.

Figure 3:
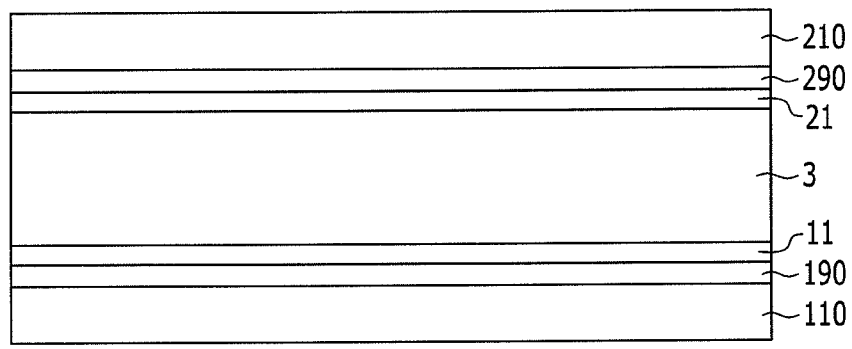
FIG. 3 is an example of a cross-sectional view of a diffractive device of the image display device according to an exemplary embodiment of the present invention.

FIG. 3 is an example of a cross-sectional view of a diffractive device of the image display device according to an exemplary embodiment of the present invention.

Referring to FIG. 3, the diffractive device 400 includes a first substrate 110 and a second substrate 210. The first substrate 110 and the second substrate 210 may be made of insulating materials such as glass, plastic, etc. The first substrate 110 and the second substrate 210 face each other and a liquid crystal layer 3 is interposed between the two substrates 110 and 210. A polarizer (not shown) may be disposed on outer surfaces of the substrates 110 and 210.

A first electrode layer 190 and a first alignment layer 11 are sequentially disposed on the first substrate 110 and a second electrode layer 290 and a second alignment layer 21 are sequentially disposed on the second substrate 210.

The first electrode layer 190 and the second electrode layer 290 include a plurality of electrodes and may be made of a transparent conductive material such as ITO (indium tin oxide) or IZO (indium zinc oxide). The first electrode layer 190 and the second electrode layer 290 generate an electric field in the liquid crystal layer 3 depending on an applied voltage and control alignment of liquid crystal molecules of the liquid crystal layer 3.

The alignment layers 11 and 21 determine an initial alignment of the liquid crystal molecules of the liquid crystal layer 3, predetermine alignment directions of the liquid crystal molecules, and may quickly align the liquid crystal molecules depending on the electric field formed in the liquid crystal layer 3.

The liquid crystal layer 3 may be aligned in various modes such as a horizontal alignment mode and a vertical alignment mode. Further, in an exemplary embodiment, in an initial alignment state, a long axial direction of the liquid crystal molecules cannot be twisted from the first substrate 110 to the second substrate 210.

The diffractive device 400 operates in the 2D mode or 3D mode depending on the voltage applied to the first electrode layer 190 and the second electrode layer 290. For example, when the voltage is not applied to the first electrode layer 190 and the second electrode layer 290, the diffractive device 400 operates in the 2D mode and when the voltage is applied to the first electrode layer 190, the diffractive device 400 may operate in the 3D mode. For this, an initial alignment direction of the liquid crystal molecules 31 and a transmission axial direction of the polarizer may properly be controlled.

Hereinafter, the diffractive device operating in the 3D mode will be described.

Figure 4:
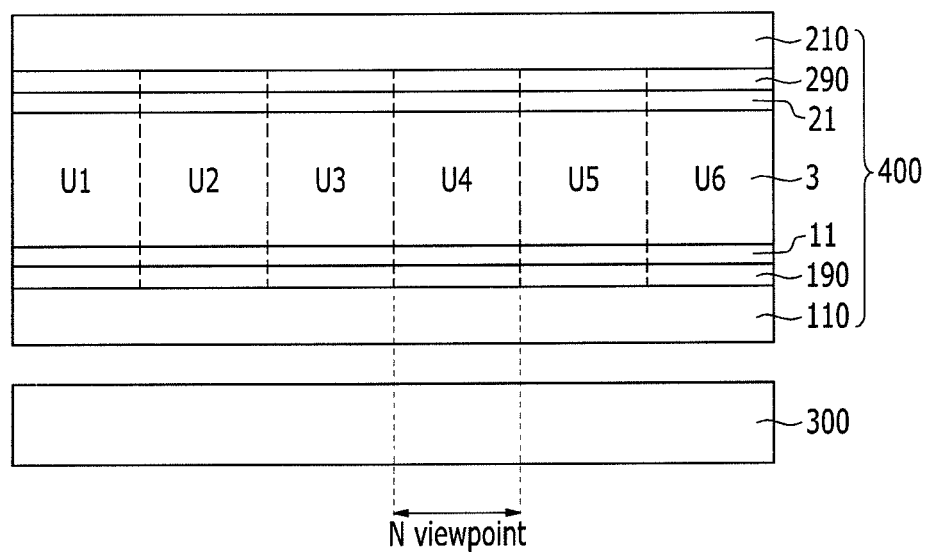
FIGS. 4 to 6 show various methods operating in a 3D mode in the image display device according to an exemplary embodiment of the present invention.
Figure 5:
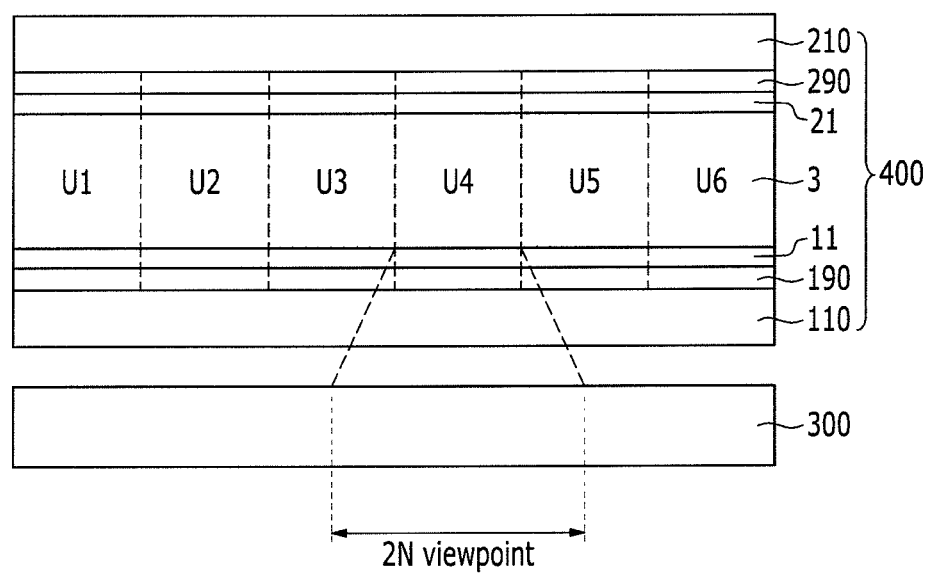
Figure 6:
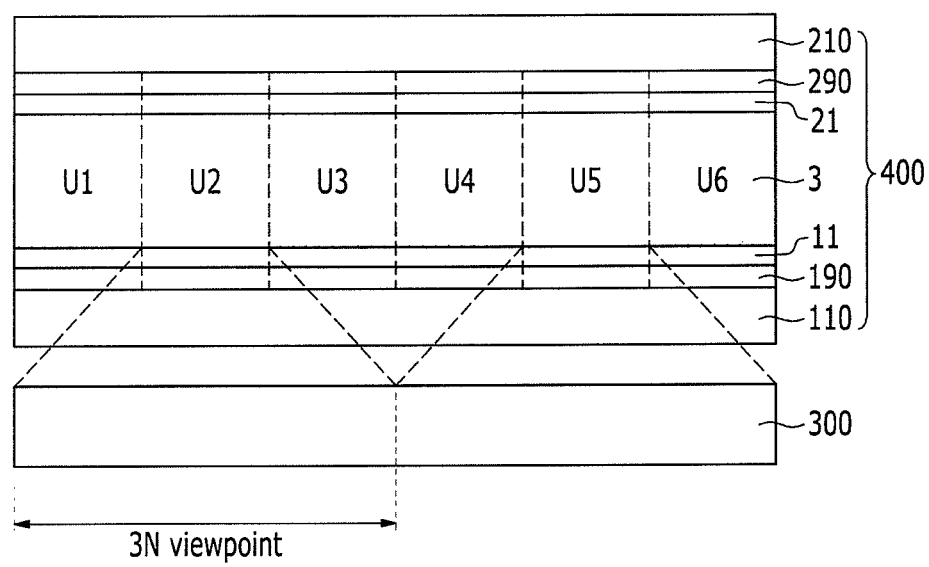

FIGS. 4 to 6 show various methods of operating the diffractive device 400 of FIG. 3 in the 3D mode in an image display device according to an exemplary embodiment of the present invention. The diffractive devices of FIGS. 4 to 6 are the same as the diffractive device 400 of FIG. 3.

Referring to FIGS. 4 to 6, the diffractive device 400 includes a plurality of unit devices U1-U6. A first electrode layer 190 and a second electrode layer 290 of the diffractive device 400 are classified (e.g., divided) into the unit devices U1-U6. When the diffractive device 400 operates in the 3D mode, the unit devices U1-U6 operate in a lens mode or a barrier mode depending on the voltage applied to the first electrode layer 190 and the second electrode layer 290.

FIG. 4 illustrates an example where all the unit devices U1-U6 in the diffractive device 400 operate in the lens mode and one unit device (e.g., U4) covers N view points of the display panel 300. For example, when N=9, one unit device covers 9 view points, where one view point corresponds to one pixel.

FIG. 5 illustrates an example where the unit devices U2, U4, and U6 operate in the lens mode and the unit devices U1, U3, and U5 operate in the barrier mode and one unit device (e.g., U4) covers 2N view points of the display panel 300. For example, when N=9, one unit device covers 18 view points. The view point coverage of FIG. 5 is two times more than that of FIG. 4.

FIG. 6 illustrates an example where the unit devices U2 and U5 operate in the lens mode and the unit devices U1, U3, U4, and U6 operate in the barrier mode and one unit device (e.g., U2) covers 3N view points of the display panel 300. For example, when N=9, one unit device covers 27 view points. The view point coverage of FIG. 6 is three times more than that of FIG. 4.

As shown in FIGS. 5 and 6, the view points covered by one unit device can be controlled by operating each of the unit devices U1-U6 of the diffractive device 400 in the lens mode or the barrier mode.

In FIGS. 5 and 6, the mode in which each of the unit devices U1-U6 operates may be changed as time elapses. Each of the unit devices U1-U6 may periodically change one operating mode of the lens mode and the barrier mode.

Each of the unit devices U1-U6 of FIG. 5 may alternately operate in the lens mode and in the barrier mode. For example, during a first duration, the unit devices U2, U4, and U6 may operate in the lens mode and the unit devices U1, U3, and U5 in the barrier mode and during the next second duration, the unit devices U2, U4, and U6 may operate in the barrier mode and the unit devices U1, U3, and U5 in the lens mode. That is, when one unit device operates in the lens mode during one duration, the unit device operates in the barrier mode during the next duration.

Each of the unit devices U1-U6 of FIG. 6 may operate in the lens mode or in the barrier mode as time elapses. For example, during the first duration, the unit devices U2 and U5 may operate in the lens mode and the unit devices U1, U3, U4, and U6 in the barrier mode, during the next second duration, the unit devices U3 and U6 may operate in the lens mode and the unit devices U1, U2, U4, and U5 in the barrier mode, and during the next third duration, the unit devices U1 and U4 may operate in the lens mode and the unit devices U2, U3, U5, and U6 in the barrier mode. That is, when one unit device operates in the lens mode during one duration, the unit device operates in the barrier mode during the next two durations.

The unit device operating in the lens mode may be implemented as a Fresnel zone plate. The Fresnel zone plate may be arranged in a radial shape as a Fresnel lens using the diffractive phenomenon of light instead of refraction by using a plurality of concentric circles where a gap becomes narrow as one moves from the center toward the outside.

When the voltage is applied to the first electrode layer 190 and the second electrode layer 290, the unit device operating in the lens mode operates as the Fresnel zone plate to refract light and may act as a lens by aligning the liquid crystal layer 3.

Optical characteristic of the Fresnel zone plate will be described with reference to FIGS. 7 and 8.

Figure 7:
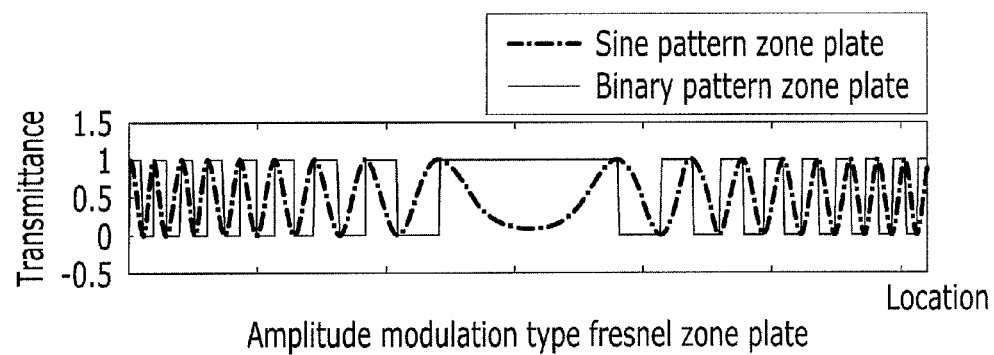
FIG. 7 is a graph illustrating an exemplary variation in light transmittance according to a location of an amplitude modulation type of Fresnel zone plate.
Figure 8:
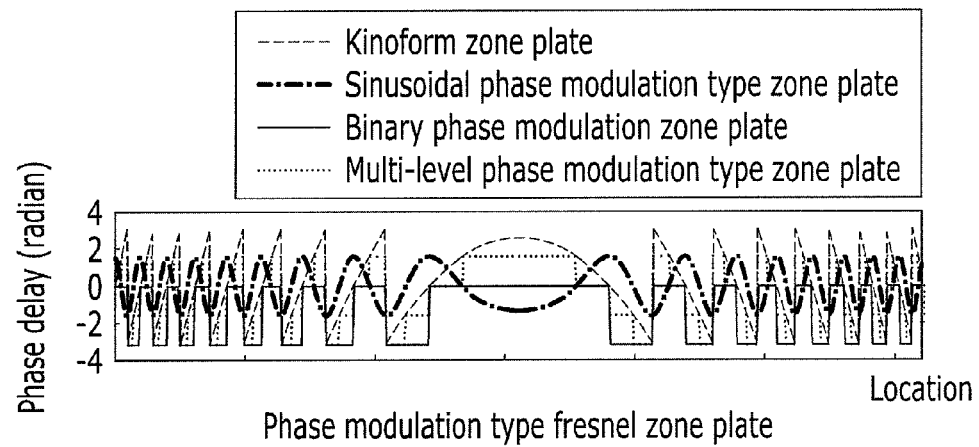
FIG. 8 is a graph illustrating an exemplary variation in phase delay according to a location of a phase modulation type of Fresnel zone plate.

FIG. 7 is a graph illustrating a variation in transmittance according to a location of an amplitude modulation type of Fresnel zone plate and FIG. 8 is a graph illustrating a variation in phase delay according to a location of a phase modulation type of Fresnel zone plate. Herein, each zone of the Fresnel zone plate is an area where each repetitive waveform is included in each graph.

Referring to FIG. 7, the amplitude modulation type of Fresnel zone plate includes a sine pattern zone plate in which transmittance in each zone is changed into a sine pattern between 0 and 1 and a binary pattern zone plate in which transmittance in each zone is divided into 1 and 0, etc. depending on a location.

Referring to FIG. 8, the phase modulation type of Fresnel zone plate includes a kinoform zone plate, a sinusoidal phase modulation zone plate, a binary phase modulation zone plate, and a multi-level phase modulation zone plate. The kinoform zone plate has the same phase delay as the Fresnel lens in each zone and the sinusoidal phase modulation zone plate has a phase changing as a sine curve in each zone. The binary phase modulation zone plate has a phase delay divided into 0 radians and $-\pi$ radians in each zone and the multi-level phase modulation zone plate has a phase delay changing into a step shape in each zone and changing through four steps in FIG. 8.

When light intensity is measured in a focal distance of each zone plate, the phase modulation type of Fresnel zone plate may have better diffractive efficiency than the amplitude modulation type of Fresnel zone plate. Among the phase modulation types, the kinoform zone plate and the multi-level phase modulation zone plate may have better diffractive efficiency, thereby having a greater light intensity in the focal distance. Accordingly, in some exemplary embodiments described herein, the multi-level phase modulation zone plate will be emphasized, but alternate embodiments are not limited thereto.

Figure 9:
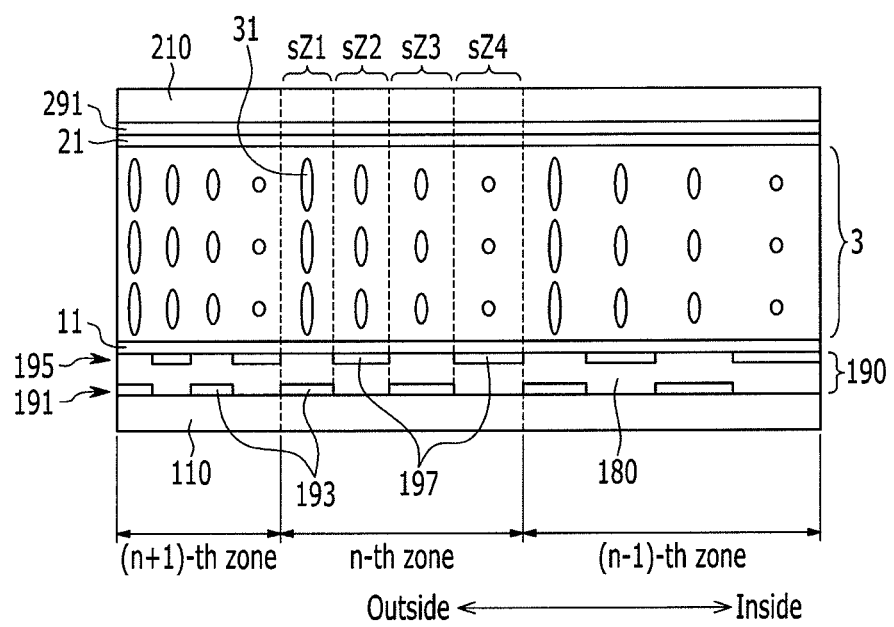
FIG. 9 is a partial cross-sectional view of a unit device according to an exemplary embodiment of the present invention.
Figure 10:
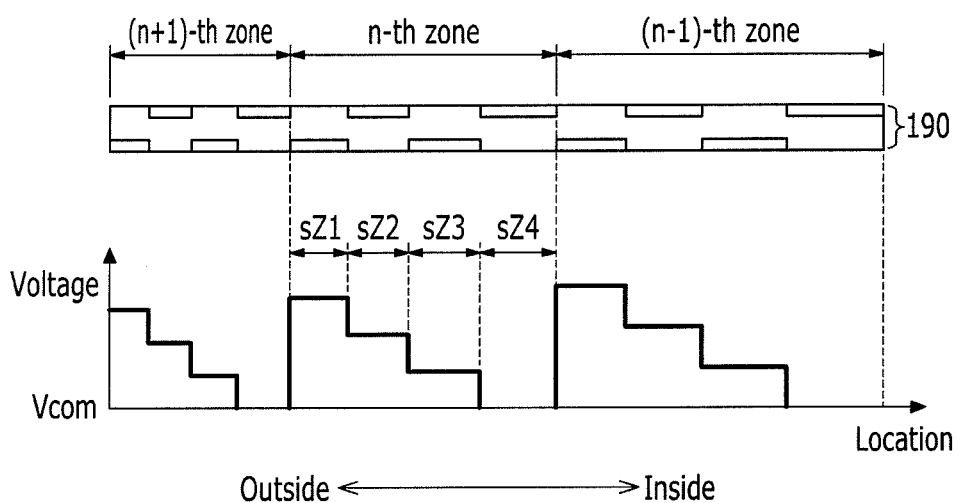
FIG. 10 is a diagram illustrating an exemplary voltage applied to an electrode when the unit device of FIG. 9 operates in a lens mode.
Figure 11:
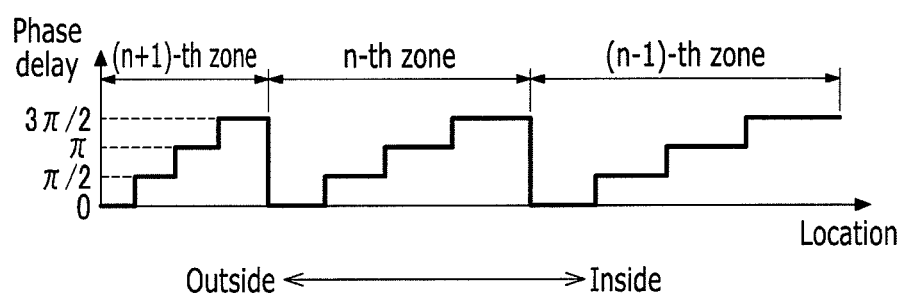
FIG. 11 is a diagram illustrating an exemplary phase delay in each zone when the unit device of FIG. 9 operates in a lens mode.
Figure 12:
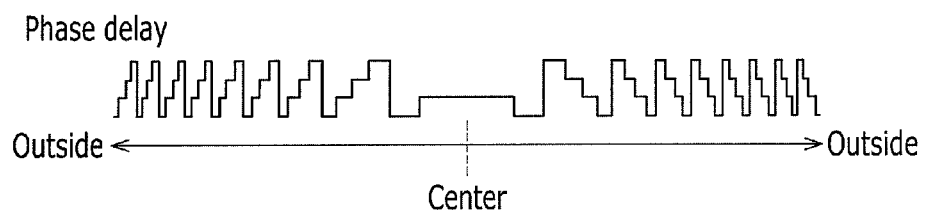
FIG. 12 is a diagram illustrating an exemplary phase delay in the unit device when the unit device of FIG. 9 operates in a lens mode.
Figure 13:
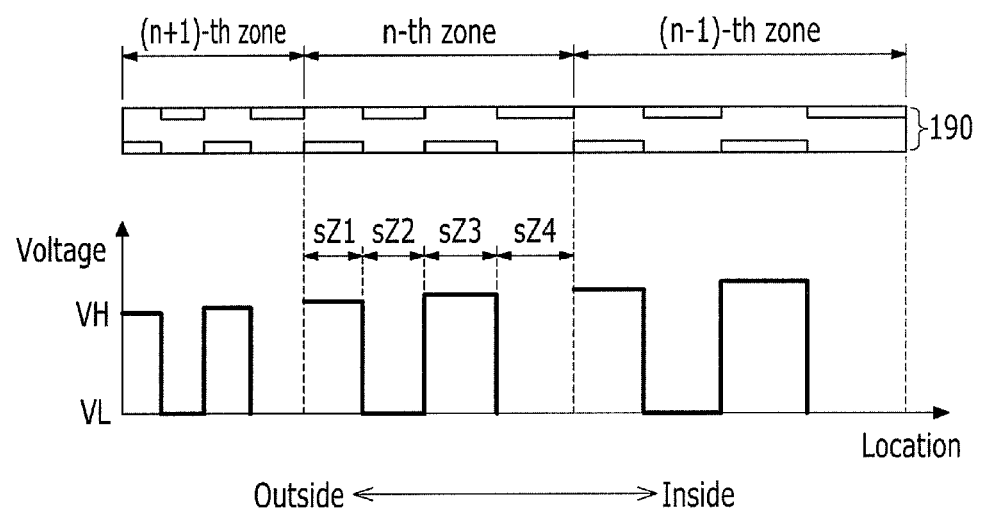
FIG. 13 is a diagram illustrating an exemplary voltage applied to an electrode when the unit device of FIG. 9 operates in a barrier mode.
Figure 14:
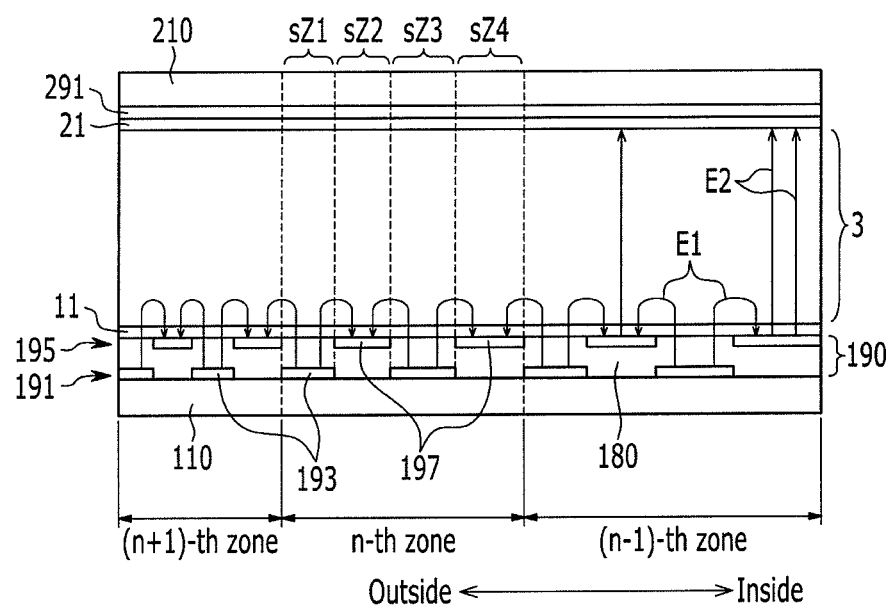
FIG. 14 is a diagram illustrating an exemplary electric field formed in the unit device in FIG. 13.

Hereinafter, an exemplary embodiment of a unit device which operates in a lens mode or a barrier mode will be described with reference to FIGS. 9 to 14 and FIG. 3. In FIGS. 9 to 14 and FIG. 3, the same reference numerals refer to the same elements FIG. 9 is a partial cross-sectional view of a unit device according to an exemplary embodiment of the invention. FIG. 10 is a diagram illustrating a voltage applied to an electrode when the unit device of FIG. 9 operates in a lens mode. FIG. 11 is a diagram illustrating a phase delay in each zone when the unit device of FIG. 9 operates in the lens mode, FIG. 12 is a diagram illustrating a phase delay in the unit device when the unit device of FIG. 9 operates in a lens mode. FIG. 13 is a diagram illustrating a voltage applied to an electrode when the unit device of FIG. 9 operates in a barrier mode. FIG. 14 is a diagram illustrating an electric field formed in the unit device in FIG. 13.

Referring to FIG. 9, the unit device includes a first substrate 110 and a second substrate 210 facing each other, and a liquid crystal layer 3 interposed between both substrates 110 and 210. A first electrode layer 190 and a first alignment layer 11 are sequentially formed on the first substrate 110 and a common electrode 291 and a second alignment layer 21 are sequentially formed on the second substrate 210.

The first electrode layer 190 includes a first electrode array 191 including a plurality of first electrodes 193, an insulating layer 180 formed on the first electrode array 191, and a second electrode array 195 formed on the insulating layer 180 and including a plurality of second electrodes 197.

In an exemplary embodiment, the first electrodes 193 and the second electrodes 197 are alternately positioned on the basis of a horizontal direction and do not overlap with each other. In FIG. 9, edges of the first electrodes 193 and the second electrodes 197 adjacent each other are shown not overlapping with each other, but may partially overlap with each other in alternate embodiments.

When a part where the center of the unit device is positioned is set as an inner part, the horizontal width of the first electrode 193 and the second electrode 197 or a gap between the electrodes 193 and 197 is narrowed gradually as one moves from the inner part outwards. Two first electrodes 193 and two second electrodes 197 are positioned in each zone of a zone plate such as an (n−1)-th zone, an n-th zone, and a (n+1)-th zone and a region where each of the electrodes 193 and 197 is positioned in each zone forms one subzone sZ1, sZ2, sZ3, or sZ4. When one moves from an outer part of the unit to the inner part across a single zone, one sequentially encounters subzones represented as sZ1, sZ2, sZ3, and sZ4. In FIG. 9, one zone is illustrated as including four subzones sZ1, sZ2, sZ3, and sZ4, but one zone is not limited to any particular number of subzones. Although not shown in FIG. 9, the horizontal width of the first electrodes 193 and the second electrodes 197 included in one zone may be uniform. The horizontal width of the electrodes 193 and 197 included in each zone may decrease as one moves from the inner part outwards.

In an exemplary embodiment, the horizontal width of the first electrodes 193 and the second electrodes 197 in all the zones may be equal to or larger than a cell gap d of the liquid crystal layer 3. In an exemplary embodiment, the cell gap d of the liquid crystal layer 3 may be 10 um or less, and in another exemplary embodiment, the liquid crystal layer 3 may be 5 um or less. It may be easier to control liquid crystal molecules of the liquid crystal layer 3 when the cell gap d is sized accordingly.

The insulating layer 180 may be made of an inorganic insulating material or an organic insulating material and electrically insulates the first electrode array 191 and the second electrode array 195 from each other.

The common electrode 291 is formed on the top of the second substrate 210 and receives a predetermined voltage such as a common voltage Vcom, or the like. The common electrode 291 may be made of a transparent conductive material such as ITO, IZO, or the like.

The alignment layers 11 and 21 may be rubbed in a longitudinal direction vertical to the width direction of the first electrodes 193 (e.g., a direction vertical to a plane of FIG. 9) and the second electrodes 197 or a direction which forms a predetermined angle therewith. The rubbing directions of the alignment layer 11 and the alignment layer 21 may be opposite to each other.

The liquid crystal molecules 31 of the liquid crystal layer 3 may be initially aligned in a direction horizontal to the surfaces of the substrates 110 and 210, but the alignment mode of the liquid crystal layer 3 is not limited thereto and may be vertically aligned.

A method in which the unit device of the diffractive device operates in a lens mode will be described below.

Referring to FIGS. 9 and 10, the first electrodes 193 and the second electrodes 197 of each zone of the unit device receive a stepwise voltage of which the magnitude is gradually increased from the inside to the outside. For example, the second electrode 197 of the subzone sZ4 may receive the common voltage Vcom, the first electrode 193 of the subzone sZ3 may receive a voltage having a first level larger than the common voltage Vcom, the second electrode 197 of the subzone sZ2 may receive a voltage having a second level larger than the first level, and the first electrode 193 of the subzone sZ1 may receive a voltage having a third level larger than the second level. The first electrode 193 or the second electrode 197 of the same subzone in each zone may be applied to cause the same phase delay.

When the common voltage Vcom is applied to the common electrode 291 and a voltage is applied to the first electrode 193 and the second electrode 197 as shown in FIG. 10, the liquid crystal molecules 31 of the liquid crystal layer 3 may be arranged as shown in FIG. 9. In the example of the horizontal alignment liquid crystal layer 3, the liquid crystal molecules 31 of the subzone sZ4 maintain a horizontal alignment to the surfaces of the substrates 110 and 210 and the liquid crystal molecules 31 of the liquid crystal layer 3 become arranged gradually in a direction vertical to the surfaces of the substrates 110 and 210 toward the subzone sZ1 from the subzone sZ3. However, in the liquid crystal layer 3 of a mode other than the horizontal alignment mode, the liquid crystal molecules may be arranged in a different direction.

By varying the arrangement of the liquid crystal molecules 31 of the liquid crystal layer 3 in the subzones sZ1, sZ2, sZ3, and sZ4, phase delay values of the liquid crystal layer 3 in the subzones sZ1, sZ2, sZ3, and sZ4 may be changed as shown in FIG. 11. For example, by gradually increasing the phase delay values in the zones of the unit device stepwise as one moves inwards, a multi-level phase modulation type zone plate of the above-mentioned Fresnel zone plate may be implemented. According to this exemplary embodiment, as the value of the voltage applied to the first electrodes 193 or the second electrodes 197 increases, the phase delay decreases. However, the liquid crystal layer 3 may be configured so that as the voltage applied to the first electrodes 193 or the second electrodes 197 increase, the phase delay increases.

The variations of the phase delay of the liquid crystal layer 3 in each zone may be made in multi-levels by adjusting the voltage applied to the common electrode 291, the first electrodes 193, and the second electrodes 197, such that the unit device forms the phase modulation type Fresnel zone plate and refracts light so that light is collected on a focus location through diffraction, extinction interference, and constructive interference of light passing through each zone. FIG. 12 illustrates one phase modulation type Fresnel zone plate implemented by using a unit device which operates in a lens mode according to an exemplary embodiment of the present invention.

A method in which the unit device operates in a barrier mode will be described below.

Referring to FIGS. 13 and 14, the first electrodes 193 of the unit device receive a high voltage VH and the second electrodes 197 receive a low voltage VL, such that a fringe field E1 is formed between the first electrodes 193 and the second electrodes 197. Liquid crystals of the liquid crystal layer 3 are aligned in a direction vertical to the fringe field E1 to decrease transmittance. Therefore, the unit device operates in the barrier mode.

As such, when the unit device operates in the barrier mode, a voltage is applied to the first electrodes 193 and the second electrodes 197 to form the fringe field E1 between the first electrodes 193 and the second electrodes 197. The voltage applied to the first electrodes 193 and the second electrodes 197 may be controlled so that the transmittance of the unit device is equal to or less than a predetermined value. The voltage applied to the first electrodes 193 and the second electrodes 197 may be different for each zone and may be different for each subzone even in the same zone. Further, the voltage applied to the first electrodes 193 and the second electrodes 197 may be controlled depending on the horizontal width of the electrodes 193 and 197.

However, the common electrode 291 receives a predetermined voltage such as the common voltage Vcom, or the like. Therefore, in the unit device, an electric field E2 between the first electrodes 193 and the common electrode 291 and between the second electrodes 197 and the common electrode 291 is also formed in addition to the fringe field E1 formed between the first electrodes 193 and the second electrodes 197. In the unit device of FIG. 14, since the horizontal width of the electrodes 193 and 197 increases as one moves toward the center from the outside, the influence of the electric field E2 formed between the electrodes 193 and 197 and the common electrode 291 increases toward the center. Therefore, it may be difficult to control the transmittance of the center of the unit device. When the transmittance of the center of the unit device is not equal to or less than a predetermined value, the unit device cannot operate in the barrier mode.

An exemplary embodiment of the unit device which operates in a lens mode or a barrier mode will be described with reference to FIG. 15 and FIGS. 9 to 14. In FIG. 15 and FIGS. 9 to 14, the same reference numerals refer to the same elements.

Figure 15:
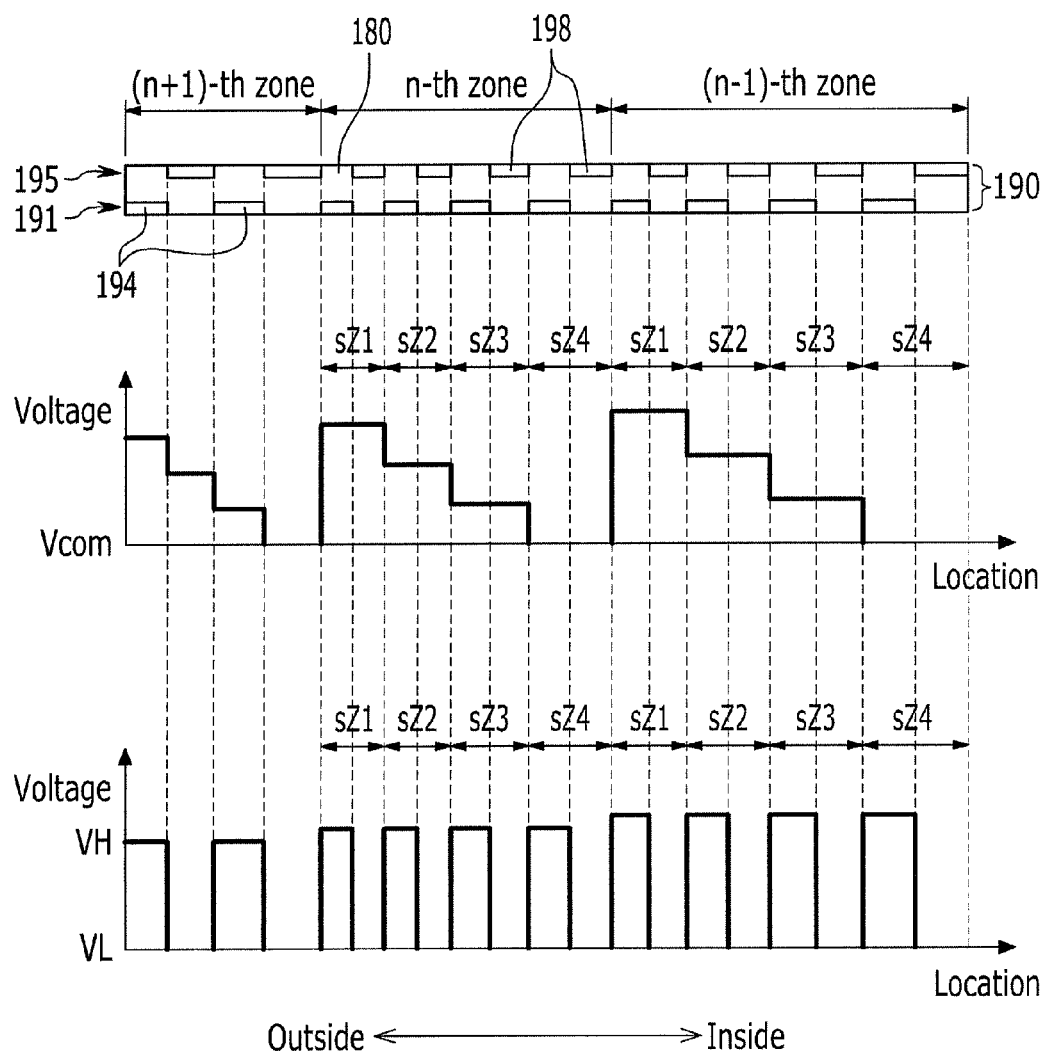
FIG. 15 is a diagram illustrating an exemplary voltage applied to a unit device according to an exemplary embodiment of the present invention.

FIG. 15 is a diagram illustrating a voltage applied to a unit device according to a exemplary embodiment of the invention. Referring to FIG. 15, the unit device according to this exemplary embodiment is substantially similar to the unit device shown in FIG. 9, except for the structure of the first electrode layer 190.

In the unit device according to this exemplary embodiment, the first electrode layer 190 includes a first electrode array 191 including a plurality of first electrodes 194, an insulating layer 180 formed on the first electrode array 191, and a second electrode array 195 formed on the insulating layer 180 and including a plurality of second electrodes 198.

The numbers of the first electrodes 194 and the second electrodes 198 included in the subzones sZ1, sZ2, sZ3, and sZ4 of each zone in the unit device depend on locations of the zones.

In an (n−1)-th zone and an n-th zone, each of the subzones sZ1, sZ2, sZ3, and sZ4 includes one first electrode 194 and one second electrode 198. As a result, a total of four first electrodes 194 and four second electrodes 198 are located in the (n−1)-th zone and the n-th zone respectively. In an (n+1)-th zone, each of the subzones sZ1, sZ2, sZ3, and sZ4 includes one first electrode 194 or second electrode 198. As a result, a total of two first electrodes 194 and two second electrodes 198 are positioned in the (n+1)-th zone. Each of the subzones sZ1, sZ2, sZ3, and sZ4 includes at least one electrode 194 or 198 and the number of the electrodes 194 and 198 included in each zone gradually decreases as one moves toward the outside from the center. However, the numbers of the first electrodes 194 and the second electrodes 198 included in several adjacent zones may be the same. In an exemplary embodiment, the horizontal width of the electrodes 194 and 198 may be approximately 5 um or less. Therefore, it is possible to prevent the horizontal width of the electrodes 194 and 198 from increasing when one moves toward the inside from the outside.

The first electrodes 194 or the second electrodes 198 included in the same subzone sZ1, sZ2, sZ3, or sZ4 in each zone receive a voltage causing the same phase delay to operate the unit device in the lens mode. Further, as the subzones sZ1, sZ2, sZ3, and sZ4 are positioned more outwards in each zone, the first electrode 194 and the second electrode 198 receive a high voltage, such that the voltage applied to each zone and the resulting phase delay value of the liquid crystal layer 3 form stepwise multi-levels like the above-mentioned exemplary embodiment.

The unit device operates in the barrier mode when the first electrodes 194 of the unit device receive a high voltage VH and the second electrodes 198 receive a low voltage VL. Therefore, a fringe field is formed between the first electrodes 194 and the second electrodes 198. Unlike the example in which the unit device operates in the lens mode, although the first electrode 194 and the second electrode 198 are included in the same subzone sZ1, sZ2, sZ3, or sZ4, they receive different voltages.

Since the horizontal width of the electrodes 194 and 198 does not increase when one moves toward the inside from the outside, the electric field formed between the electrodes 194 and 198 and the common electrode 291 may be reduced at the center of the unit device. Accordingly, the transmittance of the center of the unit device can be more easily controlled and the unit device can operate in the barrier mode.

Figure 16:
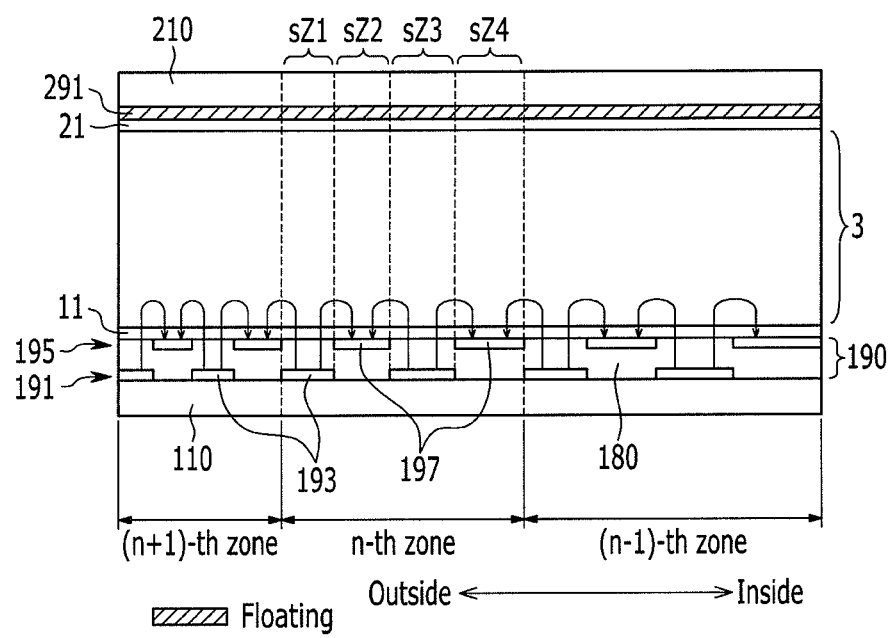
FIG. 16 is a diagram illustrating exemplary electric fields applied to unit devices according to an exemplary embodiment of the present invention.
Figure 17:
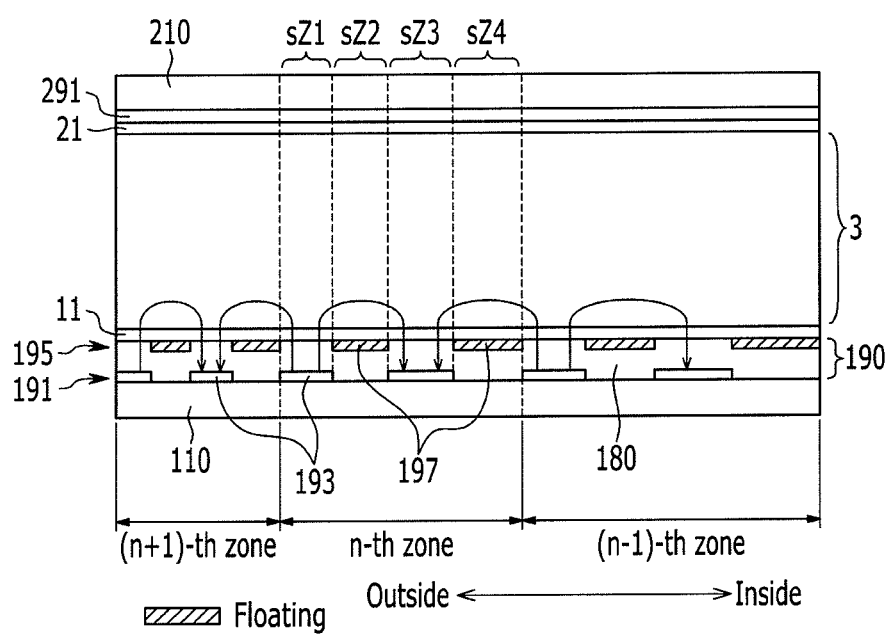
FIG. 17 is a diagram illustrating exemplary electric fields applied to unit devices according to an exemplary embodiment of the present invention.

FIGS. 16 and 17 are diagrams illustrating electric fields applied to unit devices according to exemplary embodiments of the invention, respectively. The structures of the unit devices of FIGS. 16 and 17 are the same as the structure of the unit device of FIG. 14, but are different from each other in the method of operating the unit device in the barrier mode.

Referring to FIG. 16, the voltage is applied to the electrodes 193 and 197 to form the fringe field between the first electrodes 193 and the second electrodes 197 of the unit device and the common electrode 291 is floated. Therefore, since the electric field is not formed between the electrodes 193 and 197 and the common electrode 291, the liquid crystals of the liquid crystal layer 3 is not prevented from being aligned in a direction vertical to the fringe field. The transmittance of the unit device can be more easily controlled and the unit device can operate in the barrier mode.

Referring to FIG. 17, the voltage is applied to only the first electrodes 193 of the unit device and the second electrodes 197 are floated. The common electrode 291 may be floated or the common voltage may be applied. The voltage is applied to the first electrodes 193 of the unit device to form an in-plane electric field between the first electrodes which are adjacent thereto. For example, when the high voltage VH is applied to one first electrode 193, the low voltage VL is applied to first electrodes 193 which are adjacent thereto.

Figure 18:
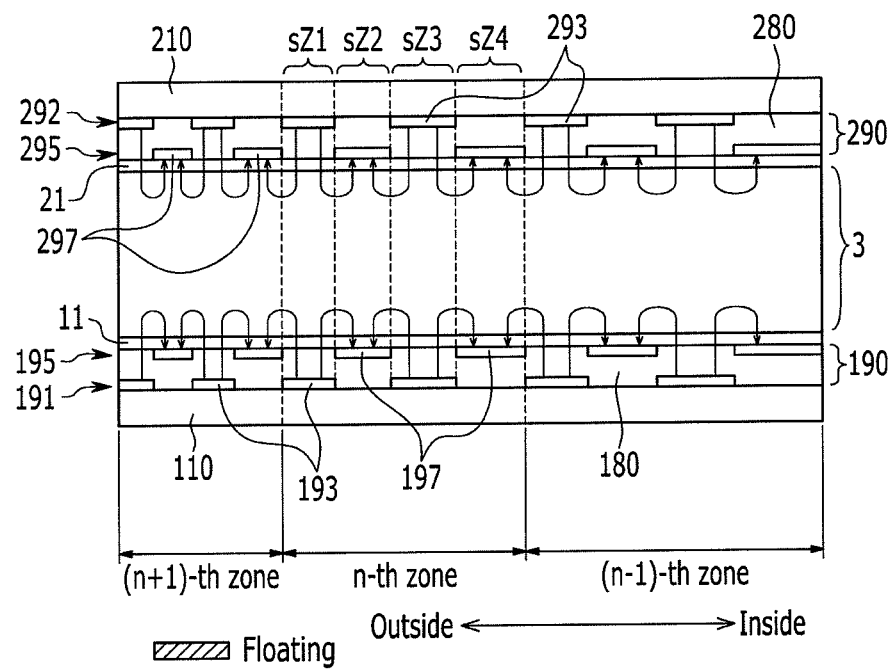
FIG. 18 is a diagram illustrating exemplary electric fields applied to unit devices according to an exemplary embodiment of the present invention.
Figure 19:
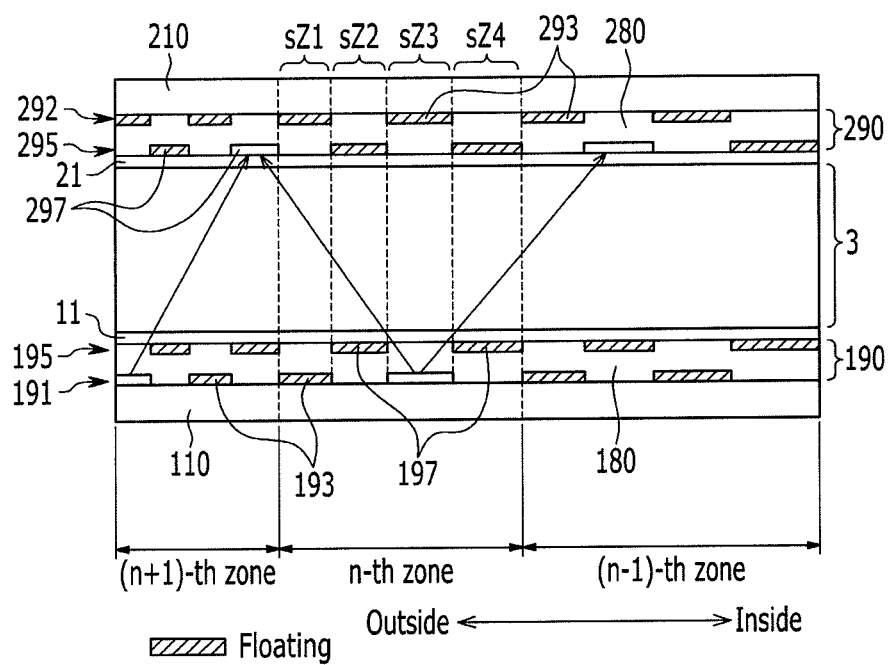
FIG. 19 is a diagrams illustrating exemplary electric field applied to unit devices according to an exemplary embodiment of the present invention.

FIGS. 18 and 19 are diagrams illustrating electric fields applied to unit devices according to exemplary embodiments of the invention, respectively. The unit devices of the FIGS. 18 and 19 are substantially similar to the unit device shown in FIG. 9, except for the structure of the second electrode layer 290. In FIG. 9, FIG. 18, and FIG. 19, the same reference numerals refer to the same elements.

Referring to FIGS. 18 and 19, the second electrode layer 290 includes a third electrode array 292 including a plurality of third electrodes 293, an insulating layer 280 formed on the third electrode array 292, and a fourth electrode array 295 formed on the insulating layer 280 and including a plurality of fourth electrodes 297. For example, the second electrode layer 290 is vertically symmetric to the first electrode layer 190. When the unit device operates in the lens mode, the common voltage Vcom is applied to the third electrodes 293 and the fourth electrodes 297 of the second electrode layer 290, such that the second electrode layer 290 serves as the common electrode 291 of FIG. 9.

In FIG. 18, when the unit device operates in the barrier mode, the voltage is applied to the electrodes 193 and 197 to form the fringe field between the first electrodes 193 and the second electrodes 197 of the first electrode layer 190. Further, the voltage is applied to the electrodes 293 and 297 to form the fringe field between the third electrodes 293 and the fourth electrodes 297 of the second electrode layer 290. By forming the fringe field in each of the first electrode layer 190 and the second electrode layer 290, it may be possible to control the alignment of the liquid crystals of the liquid crystal layer 3 more easily than when the fringe field is formed only in the first electrode layer 190.

In FIG. 19, when the unit device operates in the barrier mode, the high voltage VH is applied to only some first electrodes 193 among the plurality of first electrodes 193 of the first electrode layer 190 and the low voltage VL is applied to only some fourth electrodes 297 among the plurality of fourth electrodes 297 of the second electrode layer 290. The rest of the electrodes 193, 197, 293, and 297 are floated. The fourth electrodes 297 to which the low voltage VL is applied are positioned between the first electrodes 193 to which the high voltage VH is applied. The electric field is formed in the first electrodes 193 to which the high voltage VH is applied and the fourth electrodes 297 to which the low voltage VL is applied, and the liquid crystals of the liquid crystal layer 3 are aligned vertically to the electric field to reduce transmittance. Therefore, the unit device operates in the barrier mode.

As such, the unit device is operable in a 2D mode or a 3D mode and when the unit device operates in the 3D mode, a diffractive device including the unit device, which can operate in the lens mode or the barrier mode may be provided. Therefore, since the diffractive device does not need to include each of a lens and a barrier, the volume of the diffractive device may be reduced and arrangement problems encountered by the presence of both a lens and a barrier may be eliminated. Accordingly, an image display device can be more easily mass-produced. Further, by controlling a unit device, which operates in the lens mode and the barrier mode during the same time duration, it is possible to implement various viewpoints.

However, with a diffractive device serving as the lens by using the liquid crystals, it may be difficult to implement a discontinuous point of a refractive index generated at a boundary between the unit devices. Further, in the unit device as described in the exemplary embodiment of FIG. 9, since the horizontal width of the electrodes (e.g., 193 and 197 of FIG. 9) decreases as one moves toward the outside, it may be difficult to form a desired refractive index distribution. Accordingly, in an alternate embodiment of the invention, the cell gap of the liquid crystal layer is made smaller than the horizontal width of the electrode. However, there is a limit in reducing the cell gap of the liquid crystal layer due to process limitations and a liquid crystal refractive index limit.

Figure 20:
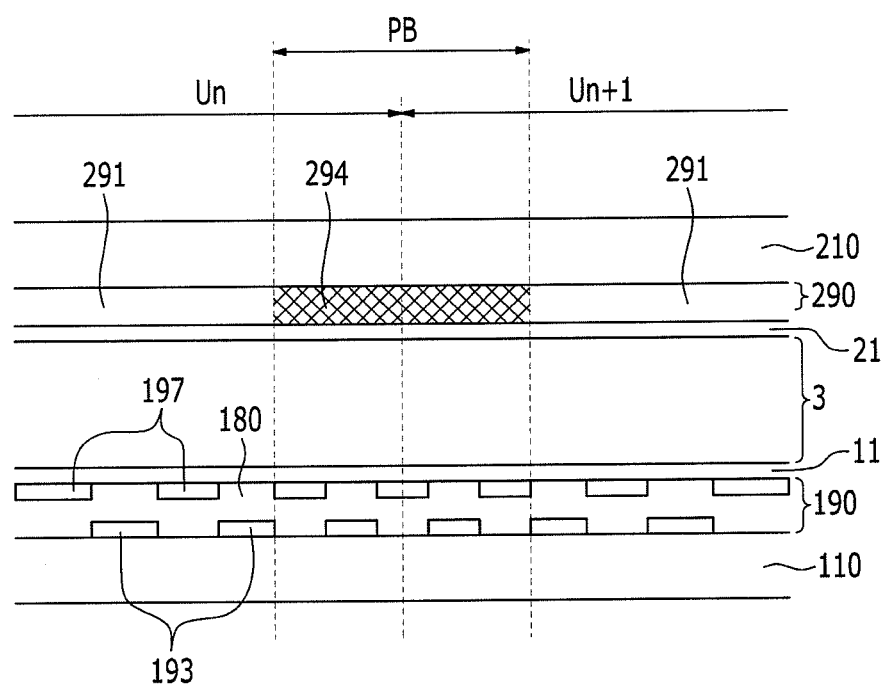
FIG. 20 is an example of a cross-sectional view of a diffractive index of an image display device according to an exemplary embodiment of the present invention.

FIG. 20 is an example of a cross-sectional view of a diffractive device of an image display device according to an exemplary embodiment of the present invention. In FIG. 20, the same reference numerals refer to the same elements as that of the previous exemplary embodiment.

Referring to FIG. 20, the diffractive device includes a first substrate 110 and a second substrate 210 facing each other, and a liquid crystal layer 3 interposed between both substrates 110 and 210.

A first electrode layer 190 and a first alignment layer 11 are sequentially formed on the first substrate 110 and a second electrode layer 290 and a second alignment layer 21 are sequentially formed on the second substrate 210.

The diffractive device includes a plurality of unit devices Un and Un+1 and a barrier PB formed at boundaries between the unit devices Un and Un+1.

The horizontal width of the first electrodes 193 and the second electrodes 197 or a gap between the electrode 193 and 197 gradually decreases as one moves from one end of each of the unit devices Un and Un+1 to the other end.

The horizontal width of the first electrodes 193 and the second electrodes 197 or the gap therebetween of the first electrode layer 190 corresponding to the barrier PB may be formed uniformly. The horizontal width of the electrodes 193 and 197 may be equal to or larger than a cell gap d of the liquid crystal layer 3.

The voltage may be applied to the first electrodes 193 and the second electrodes 197 of the first electrode layer 190 corresponding to the barrier PB to form the electric field between the first electrodes 193 and the second electrodes 197. For example, the first electrodes 193 in the barrier PB may receive the high voltage VH and the second electrode 197 in the barrier PB may receive the low voltage VL or the first electrodes 193 and the second electrode 197 in the barrier PB may receive voltages opposite thereto. The liquid crystals of the liquid crystal layer 3 corresponding to the barrier PB may be aligned vertically to the electric field to reduce the transmittance. Therefore, the boundary between the unit devices Un and Un+1 serves as a barrier PB that prevents light from being transmitted.

The second electrode layer 290 includes the common electrode 291 and a region 294 without the common electrode. The region 294 without the common electrode corresponds to the barrier PB.

Figure 21:
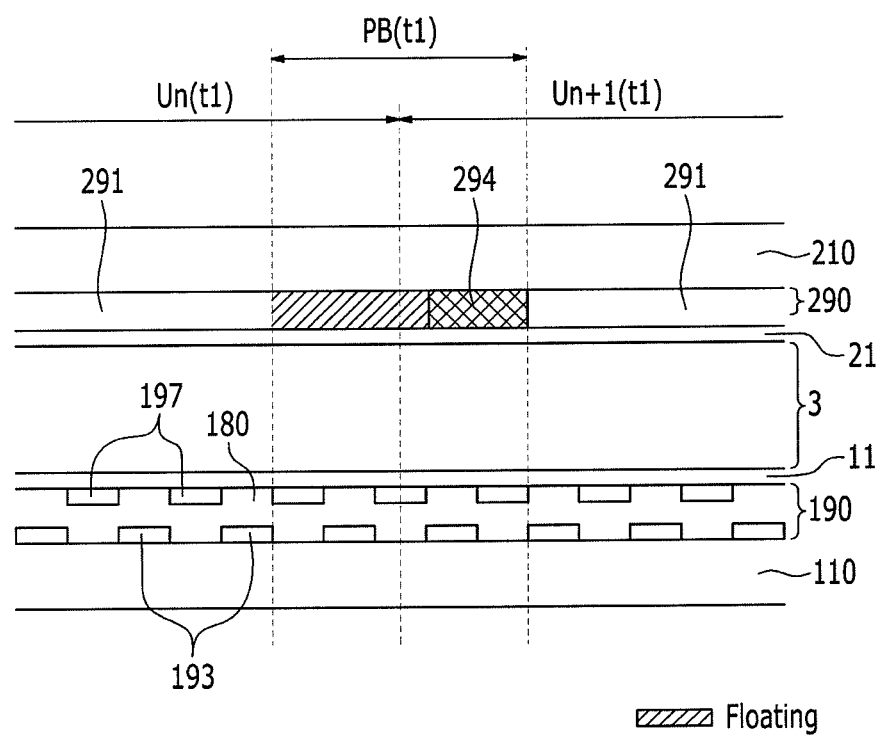
FIGS. 21 and 22 are examples of a cross-sectional view of a diffractive device of an image display device according an exemplary embodiment of the present invention.
Figure 22:
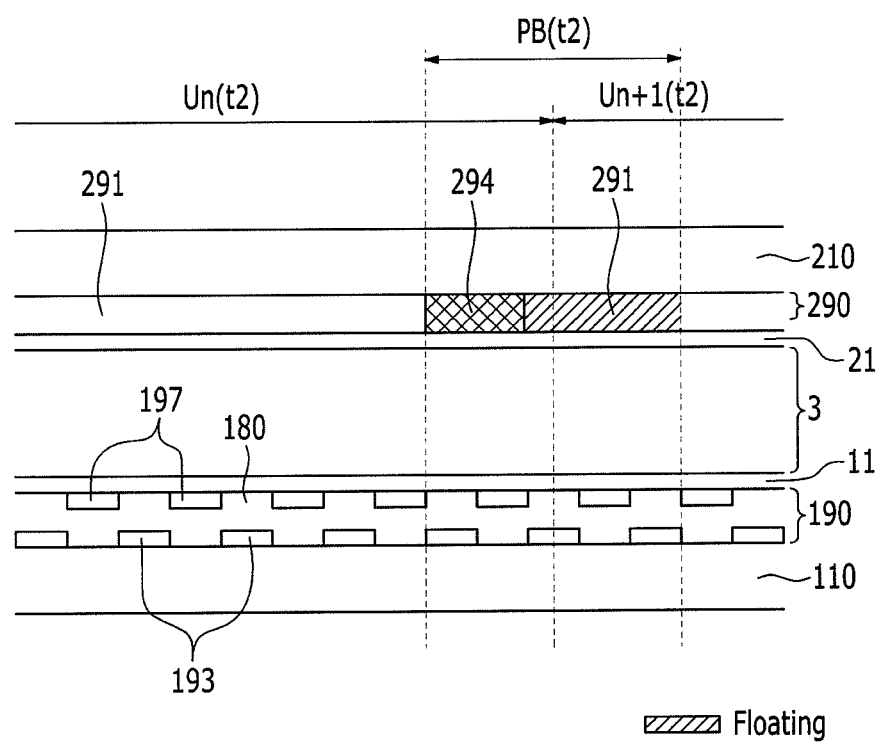

FIGS. 21 and 22 are examples of cross-sectional views of a diffractive device of an image display device according to an exemplary embodiment of the present invention. In FIGS. 21 and 21, the same reference numerals refer to the same elements as that of the previous exemplary embodiment.

Referring to FIGS. 21 and 22, the horizontal width of the first electrodes 193 and the second electrodes 197 or the gap therebetween is uniform regardless of the locations in the unit devices Un and Un+1. The width of the electrodes 193 and 197 may be the same as the gap between the electrodes 193 and 197. In alternate embodiments, the horizontal width of the first electrodes 193 and 197 may be equal to or larger than the cell gap d of the liquid crystal layer 3.

In the example of the diffractive device of FIGS. 21 and 22, the locations of the unit devices Un and Un+1 may shift as time elapses. FIG. 21 illustrates unit devices Un and Un+1 at a time t1 and FIG. 22 illustrates unit devices Un and Un+1 where the locations shift at a time t2. Accordingly, barriers PB(t1) and PB(t2) also shift as time elapses.

In FIGS. 21 and 22, the second electrode layer 290 corresponding to the barriers PB(t1) and PB(t2) includes the common electrode 291 (shown with diagonal lines) and the region 294 without the common electrode. In the second electrode layer 290 corresponding to the barriers PB(t1) and PB(t2), the common electrode 291 (shown with diagonal lines) is floated.

As such, by using the barrier PB as the boundary of the unit device, light leakage from the boundary between the unit devices may be reduced or eliminated. Further, the horizontal width of the electrode formed in the barrier may be larger than that of the electrode without the barrier. Accordingly, there is no need to make the cell gap smaller as compared with the example where the barrier is not formed.

Having described exemplary embodiments of the invention, it is to be understood that the invention is not limited to the disclosed embodiments, but, on the contrary, is intended to cover various modifications and equivalent arrangements included within the spirit and scope of the disclosure.

What is claimed is:

1. An image display device, comprising: a display panel configured to display an image; and a diffractive device configured to operate in a 2D mode to enable perception in of the image as a 2D image and operate in a 3D mode to enable perception of the image as a 3D image, wherein the diffractive device includes a plurality of unit devices, and wherein the diffractive device includes barriers formed on boundaries between the plurality of unit devices, wherein the diffractive device comprises: a first substrate and a second substrate facing each other; a first electrode layer formed on the first substrate; a second electrode layer formed on the second substrate; and a liquid crystal layer interposed between the first substrate and the second substrate, wherein the second electrode layer includes a common electrode, wherein the first electrode layer includes a first electrode array including a plurality of first electrodes, a second electrode array including a plurality of second electrodes, and a first insulating layer insulating between the first electrode array and the second electrode array.

2. The image display device of claim 1, wherein a first voltage is applied to the first electrode array of a portion corresponding to the barrier among the first electrode layer and a second voltage lower than the first voltage is applied to the second electrode array of the portion corresponding to the barrier among the first electrode layer.

3. The image display device of claim 2, wherein both widths of the plurality of first electrodes and widths of the plurality of second electrodes are the same.

4. The image display device of claim 3, wherein locations of the plurality of unit devices and the barrier shift as time elapses.

5. The image display device of claim 4, wherein the common electrode of a portion corresponding to the barrier among the second electrode layer is floated.

* * * * *